(12) United States Patent
Shah et al.

(10) Patent No.: US 8,392,708 B2
(45) Date of Patent: *Mar. 5, 2013

(54) AUDITING DATA INTEGRITY

(75) Inventors: Mehul A. Shah, Saratoga, CA (US); Ram Swaminathan, Cupertino, CA (US); Robert Samuel Schreiber, Palo Alto, CA (US); Alan H. Karp, Palo Alto, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 1036 days.

This patent is subject to a terminal disclaimer.

(21) Appl. No.: 12/240,742

(22) Filed: Sep. 29, 2008

(65) Prior Publication Data

US 2010/0080391 A1      Apr. 1, 2010

Related U.S. Application Data

(60) Provisional application No. 61/000,950, filed on Oct. 30, 2007.

(51) Int. Cl.
*H04L 9/32* (2006.01)

(52) U.S. Cl. ...................................... 713/168
(58) Field of Classification Search .................. 713/168
See application file for complete search history.

(56) References Cited

PUBLICATIONS

Baker et al. (May 2007). Auditing to keep online storage services honest. Retrieved Mar. 13, 2012 from http://www.hpl.hp.com/personal/Mary_Baker/digipres.html.*
Ateniese et al. (May 2007). Provable Data Possession at Untrusted Stores. Retrieved Mar. 13, 2012 from http://eprint.iacr.org/2007/202.*
Yumerefendi, A. and Chase, J. (2005). The Role of Accountability in Dependable Distributed Systems. HotDep, 2005.*
Shah, M.A., Swaminathan, R., Baker, M. (Apr. 25, 2008). Privacy-Preserving Audit and Extraction of Digital Contents. Retrieved Oct. 18, 2012 from http://eprint.iacr.org/2008/186.*

* cited by examiner

*Primary Examiner* — Ashok Patel
*Assistant Examiner* — Brian Shaw

(57) ABSTRACT

Various approaches are described for auditing integrity of stored data. In one approach, a data set is provided from a client to a storage provider, and the data set is stored at a first storage arrangement by the storage provider. An auditor determines whether the data set stored at the first storage arrangement is corrupt without reliance on any part of the data set and any derivative of any part of the data set stored by the client. While the auditor is determining whether the data set stored at the first storage arrangement is corrupt, the auditor is prevented from being exposed to information specified by the data set. The auditor outputs data indicative of data corruption in response to determining that the data set stored at the first storage arrangement is corrupt.

20 Claims, 7 Drawing Sheets

AUDITING DATA INTEGRITY

CROSS REFERENCE TO RELATED APPLICATIONS

This Application claims the benefit of U.S. Provisional Application Ser. No. 61/000,950, filed Oct. 30, 2007, titled "Auditing Data Integrity" which is hereby incorporated by reference herein as if reproduced in full below.

FIELD OF THE INVENTION

The present disclosure generally relates to an independent auditing of the integrity of data stored by a data storage service.

BACKGROUND

A growing number of online services aim to store voluminous client data indefinitely. Examples include online backup services, email services, photo sharing sites, video hosting sites, and general archiving of information. Many of these services are free, and many charge fees for basic or upgraded versions of their services. Unfortunately, storage services have the potential to lose or corrupt client data.

Despite the seeming viability of online storage services, this technology has only been casually embraced because users have no way to assess the reliability of these services Clients seeking the services of reliable storage service providers ("storage providers") may have only negative newsworthy anecdotes on which to base their decisions. A lack of bad publicity, however, may not be indicative of the actual reliability of the storage provider. Moreover, popularity may not be an accurate indicator of reliability. Today, clients are faced with making an uneducated choice when choosing a storage provider. A client may either blindly trust the storage provider or audit the data by laboriously retrieving the hosted data each time the integrity of the data is to be verified. Neither solution is satisfactory.

To make client-based auditing viable, a number of efficient challenge-response protocols have been proposed. These protocols establish trust between the storage provider and individual clients through repeatedly demonstrating that the clients' data are intact. If a storage provider loses or corrupts data, such protocols enable clients to quickly detect the fault and repair it using copies stored locally or by other storage providers. Client-based auditing, however, has two main disadvantages. First, it places the responsibility of data verification on a client. Some clients may view auditing as an undesirable burden and instead store and backup their data themselves. Second, typical clients, e.g. home users, are often unreliable. They may forget to check or lose valuable state needed to confirm the integrity of remotely stored data.

DETAILED DESCRIPTION

Figure 1:
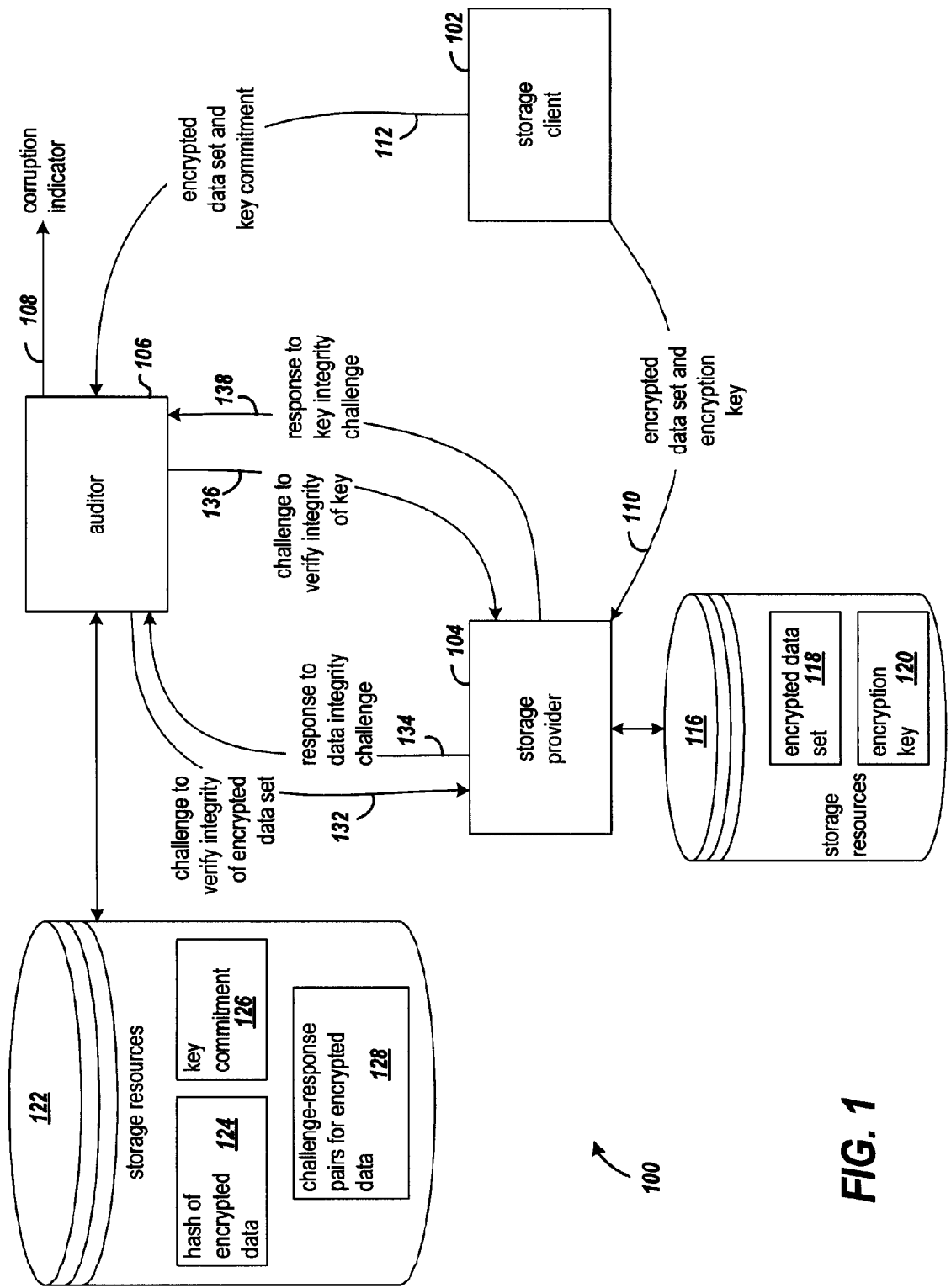
FIG. 1 is a block diagram that shows the flow of data between a client, a storage provider, and an auditor in accordance with an embodiment of the invention.

Independent third-party auditing of storage providers offers several advantages over client-based auditing. Auditors, who offer auditing services in a commercial setting, rely on professionals to implement best practices and, therefore, are likely to be more reliable than clients. Independent auditors can audit stored data on behalf of numerous clients which allows auditors to amortize the overhead of auditing and deliver a more cost-effective service to clients. Moreover, an independent auditor has little incentive to fraudulently claim loss of data because doing so and being exposed would diminish the auditor's business reputation. Third-party auditors, therefore, can provide more accurate aggregate statistics of reliability rather than anecdotes of data loss. Published statistics from multiple auditing services can establish a storage provider's overall reputation and provide up-to-date information to clients on the reliability of the storage provider's services.

On the other hand, storage providers may be reluctant to reveal client's data in the clear to third parties. One reason for the reluctance is that storage providers may be obligated, contractually or otherwise, to maintain the privacy of clients' data. Another reason for storage providers' reluctance is the desire to protect their business assets from competitors. For example, one potential threat is that client data may be retained and another may solicit clients to switch storage providers.

To address these and other issues, an auditing protocol is described in various embodiments. The auditing protocol does not reveal information embodied in the client's data to the auditor. The protocol is a challenge-response protocol in which the storage provider's responses to an auditor's challenges prove whether the storage provider retains the data. In this protocol, the auditor can generate an unbounded number of challenges to repeatedly verify the integrity of the data. In addition, the client (data owner) is not required to maintain any local backup copies or other state information associated with the data, portions or subsets of the data, or derivatives of the data or subsets in order for the auditor to verify the data. By keeping the client's data secret from the auditor, the auditing functions may be performed by any third party who is independent from both the storage provider and the client. With the auditor being an independent third party, the client may be assured that the storage provider is not falsely claiming to have the client's data intact, and the storage provider may be assured that the client is not falsely claiming that the storage provider's version of the client's data is corrupt.

The following abbreviations appear in the following description in association with the operations performed by a client (storage client), a storage provider, and an auditor.

A—auditor
C—client storage user $E_K(M)$—symmetric-key encryption of M (e.g. using AES) with key K g—generator of cyclic group $Z^*_p$ $H(E_K(M))$—one-way, collision-free hash of $E_K(M)$ $HM_i$—one-way, collision-free hash that depends on full-knowledge of $R_i$ and $E_K(M)$ HMAC—keyed hash message authentication code used to implement $HM_i$ K—encryption key M—data object p—prime number larger than encryption key, K $R_i$—the $i^{th}$ random number RC—retention contract that identifies the C and S S—storage provider In various embodiments of the invention, the auditor verifies the integrity of the client's data by verifying both the integrity of an encrypted version of the data and the integrity of the corresponding encryption key without having access to either the data or key in plaintext. The embodiments of the invention, therefore, prevent the auditor from gaining access to useful information underlying the client's data.

In one embodiment, it is assumed that both the encrypted data and encryption key are maintained by a single storage provider. This setting offers some advantages. Placing the encryption key with the storage service provides reliable storage of the key since the storage provider already understands and implements best practices for maintaining clients' data and privacy. In addition, the storage provider has the option to store the original plaintext data and generate the encrypted data as needed or vice-versa. By having access to the original data, the storage provider may provide value-added features beyond storage such as browsing or searching functions.

In another embodiment, the encrypted data and encryption key may be maintained in other ways among various independent storage providers that allow auditing. For example, to hide the underlying data from all external parties (including the storage provider), a client can separate the encrypted data and encryption key between two independent (non-colluding) storage providers that allow and support the auditing described herein.

The general approach described herein is generally composed of two parts. The first part checks the integrity of encrypted data and the second part verifies the encryption key. For ease of exposition, the description assumes both the encrypted data and corresponding encryption key are maintained by the storage provider.

FIG. 1 is a block diagram that shows the flow of data between a client 102, a storage provider 104, and an auditor 106 in accordance with an embodiment of the invention. The client 102 represents the party who claims ownership of a data set for which the client has contracted with the storage provider 104 to provide retentive storage of the encrypted data and encryption key. The storage provider supplies services for long term retention of clients' data sets, including for example, disaster recovery, and also protects the data sets from unauthorized exposure to third parties. The auditor 106 periodically, or in response to a request by the client, verifies the integrity of the data set stored by the storage provider. If the data set is corrupt, the auditor reports the corruption, for example, to the client (line 108). For ease of illustration, the blocks 102, 104, and 106 represent both the parties responsible for performing the designated functions as well as the hardware components and software processes that actually perform the functions.

The embodiments of the invention assume that all parties communicate through secure, reliable, and authenticated channels. Furthermore, the client, storage provider, and auditor have previously agreed on a sufficiently large prime number, p, and a generator, g, for cyclic group, $Z_p^*$. These values can be reused in all phases and for other instances of this protocol.

The cyclic group $Z_p^*$ contains the set of integers $\{1 \ldots p-1\}$ each of which can be generated as a distinct power of the generator, g. Stated alternatively, $g^X$ is an element of $Z_p^*$ for all $1<=X<=p-1$, and if $X<>Y$, then $g^X<>g^Y$. The invention uses multiplication and exponentiation operations in this group (modulo p) to audit an encryption key, K, without revealing K in plaintext; thus, p must be larger than K. All our encryption key verification methods rely on the hardness of the discrete-log assumption. This assumption states that given a generator, g, and value W in $Z_p^*$, it is computationally infeasible to compute X such that $W=g^X \pmod{p}$ for large primes p. Hereafter, computation involving the encryption key is assumed to be modulo p.

The embodiments of the invention include an initialization phase and a verification phase. These phases described herein are example embodiments out of possibly many embodiments. During the initialization phase the storage provider and the auditor are provided with the necessary data for each to fulfill their responsibilities with respect to the client. That is, the storage provider is provided with the encrypted data set and the corresponding encryption key that it is to retain for the client (line 110), and the auditor is provided with an encrypted data set, along with a key commitment, $g^K$, (line 112), that fixes a value representative of the key without revealing the actual key to the auditor. These values are provided by the client to the storage provider and auditor at initialization. An optional retention contract (not shown) may also be provided to both the storage provider and to the auditor. The retention contract identifies the client (or "user") and the storage provider. To verify that the client and storage provider agree at the outset, the three parties engage in an initialization protocol as detailed in FIG. 3.

For fulfilling its obligations to the client, the storage provider stores in its storage resources 116, the encrypted data set 118 and the associated encryption key 120. It will be appreciated that the encrypted data set and encryption key may be stored in the same storage resources by the same storage provider, stored in separate storage resources by the same storage provider, or stored separately by different storage providers depending on implementation requirements. To correctly verify the encrypted data and encryption key, the auditor stores and maintains in its storage resources 122, a hash value 124 of the encrypted data set, the key commitment 126, and a plurality of challenge response pairs 128. An example implementation of the challenge-response pairs are described in more detail in FIG. 3.

In the verification phase the auditor verifies the integrity of the encrypted data and the encryption key that are stored by the storage provider. Challenge-response protocols are used by the auditor to determine whether the storage provider's version of the encrypted data set and encryption key are intact. These challenge-response protocols perform the verification without revealing the data or the key in plaintext to the auditor. Furthermore, the auditor verifies the integrity of the encrypted data without relying on the client to have stored the original or encrypted data or any part thereof. Similarly, the auditor does not rely on the client to have stored the encryption key.

The challenge-response pairs 128 are used to verify the integrity of the encrypted data 118 held by the storage provider. The auditor selects a challenge from the challenge-response pairs and presents the challenge (line 132) to the storage provider. The storage provider generates a response and returns the response (line 134) to the auditor. The storage provider uses the same function to generate the response as the auditor generated in the initialization phase. If the generated response from the storage provider is equal to the expected response in the pair selected by the auditor, then the encrypted data 118 of the storage provider is consistent with that which the storage client 102 initially submitted. Once a challenge has been selected by the auditor and used as a challenge, that challenge-response pair is not used again (e.g., the pair is marked as used or removed from the set of challenge-response pairs). This verification protocol is one of many possible embodiments of challenge-response protocols to verify the integrity of the encrypted data.

Three alternative approaches for verifying the encryption key (key verification) are described herein. The three approaches all use a challenge-response protocol (lines 136 and 138). All three approaches generally use an auditor-generated random number in combination with the key commitment 126. The details of the three approaches are left to the descriptions that accompany FIGS. 5, 6, and 7.

Those skilled in the art will recognize various alternative computing and storage architectures may be suitable for the data processing arrangements that implement the functions of the storage client 102, storage provider 104, auditor 106 and associated storage resources 116 and 122. Such computing architectures generally include one or more processors, main memory, cache memory, and input/output (I/O) and network subsystems. The processors, memory, and subsystems may be arranged as a symmetric multiprocessing system, a parallel processing system, a distributed processing system, or a clustered computing arrangement according to application requirements. The retentive storage may include magnetic, optical, or solid-state storage, depending on application requirements, and be arranged in local storage, network attached storage, or in a storage area network. Those skilled in the art will recognize that different combinations of different ones of the aforementioned computing and storage architectures may be used in hosting the processes described herein for different applications.

Figure 2:
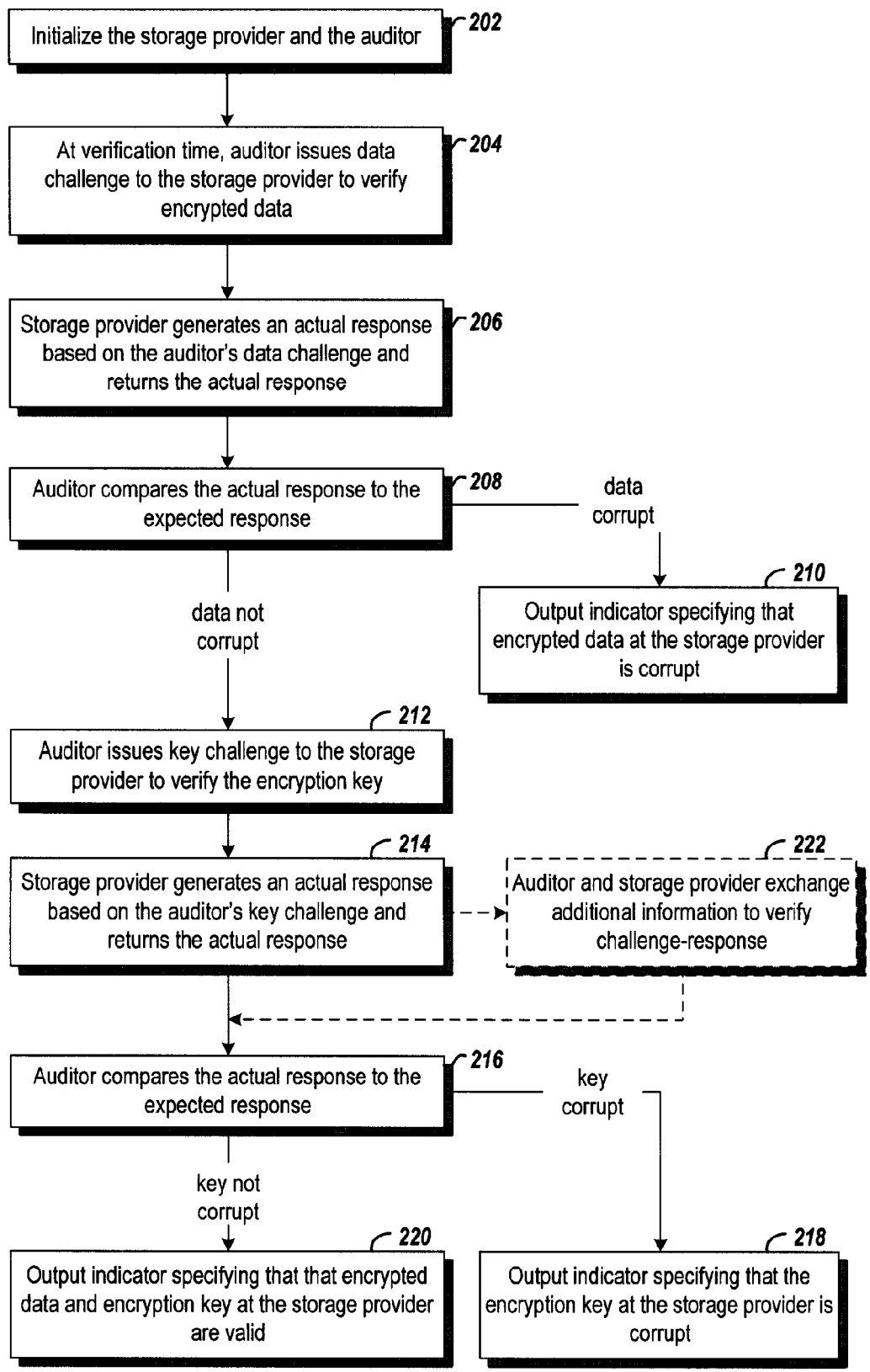
FIG. 2 is a flowchart of an example process for verifying by a third-party auditor, the integrity of encrypted data and an associated encryption key as stored at a storage provider while maintaining the privacy of the data and key from the auditor.

FIG. 2 is a flowchart of an example process for verifying by a third-party auditor, the integrity of encrypted data and an associated encryption key as stored at a storage provider while maintaining the privacy of the data and key from the auditor. The general approach is to verify the integrity of the encrypted data and the encryption key without revealing the plaintext data and the plaintext key. The process generally illustrates the initialization and verification phases introduced in the description of FIG. 1.

At step 202 the storage provider and auditor are initialized. The storage provider is initialized with the encrypted data and encryption key that it has agreed to store for the client, and the auditor is initialized with a hash of the encrypted data, challenge response pairs used for verification of the encrypted data, and a key commitment value used for verification of the encryption key. The hash of the encrypted data binds the storage provider to a particular value for the encrypted data. The key commitment value binds the storage provider to a particular value for the encryption key, yet the auditor cannot feasibly recover the plaintext key from the key commitment. It will be appreciated that in an alternative embodiment of initialization and verification, the client may generate the challenge-response pairs. The encrypted data and encryption key may be transmitted over a network (e.g., LAN or Internet) or delivered in a storage medium according to implementation requirements.

At verification time in step 204, the auditor selects one of the challenge-response pairs and transmits the data challenge to the storage provider. Since the challenge-response pairs are pseudo-randomly generated by the auditor, the storage provider cannot feasibly deceive the auditor and client by predicting and preparing for the possible challenges at the time the client first provided the encrypted data set.

In response to receipt of the data challenge, at step 206 the storage provider generates a response (the "actual response") using the stored encrypted data and the data challenge received from the auditor and returns the actual response to the auditor. In response to receiving the actual response code from the storage provider, at step 208 the auditor compares the actual response to the expected response. If the actual response does not match the expected response, at step 210 the auditor outputs an indicator that specifies that the encrypted data held by the storage provider is not the same as the original. The indicator may take any of a variety of forms depending on implementation requirements, for example, a simple status code returned or transmitted from one process to another, an email message, or an updated display screen. The output of the indicator may further include storing the data in system memory or in any of a variety of retentive storage devices. Where output of an indicator or data is specified elsewhere in this description, the output is intended to cover the various forms, formats, and use of storage media and transmission media mentioned above and described elsewhere in this description.

If the actual response matches the expected response, the auditor proceeds to step 212 to verify the integrity of the encryption key held by the storage provider. In an example embodiment, the auditor generates an appropriately selected pseudo-random number, •. The auditor generates a key challenge that is a function of • and an expected response that is a function of • and the key commitment, while keeping • secret from the storage provider. The storage provider at step 214 generates an actual key response value that is a function of the key challenge and plaintext encryption key, while keeping K secret from the auditor. Depending on the implementation, in generating the actual key response the storage provider may apply a hash function and/or apply exponentiation. If the encryption key is intact, the actual response will be equivalent to the expected response. The auditor then compares the actual response to the expected key response at step 216. If the actual key response does not match the expected key response, at step 218 the auditor outputs an indicator specifying that the storage provider's version of the encryption key is corrupt. If the actual key response matches the expected key response, at step 220 the auditor outputs data that indicates that the storage provider's versions of both the client's encrypted data and the encryption key are as the client submitted them. It will be appreciated that the order of separate verifications of the encrypted data set and the key by the auditor may be reversed.

In an alternative embodiment, verification of the encryption key may further include an additional exchange of information in order to verify that the auditor is complying with and not attempting to subvert the key verification protocol as shown by step 222.

Figure 3:
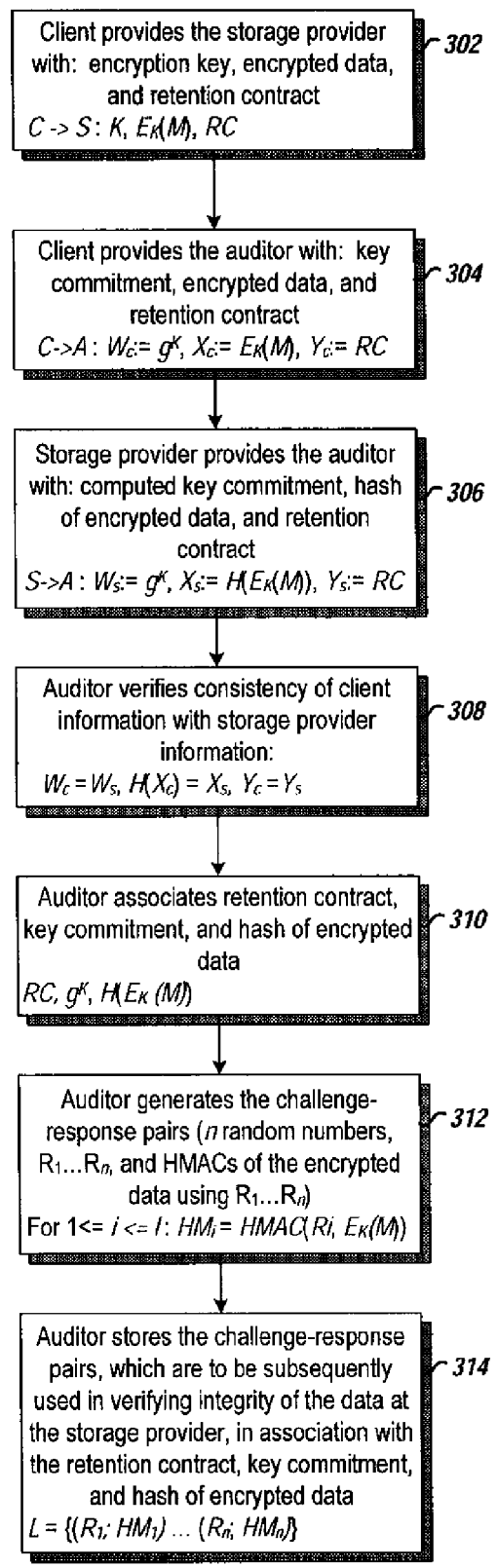
FIG. 3 is a flowchart of an example process for initializing the auditor in accordance with an embodiment of the invention.

FIG. 3 is a flowchart of an example process for initializing the auditor in accordance with an embodiment of the invention. At step 302, the client provides the storage provider with the encryption key (can be chosen by the client), the encrypted data set and the retention contract, denoted as: C→S: K, $E_K(M)$, RC. Similar notation is used in FIGS. 3-7. The data can be encrypted using any well-known, cryptographically secure, symmetric-key encryption scheme, e.g. AES.

At step 304 the client provides the auditor with the client-generated key commitment (i.e., the cyclic group generator raised to the value of the encryption key ($g^K$)), the encrypted data set, and the retention contract, denoted as: C->A: $W_c:=g^K$, $X_c:=E_K(M)$, $Y_c:=RC$. In the notation, the operand on the left side of the :=operator specifies the variable bound to the operand that is on the right side. At step 306, the storage provider provides the auditor with the storage provider-generated key commitment, a hash of the encrypted data set, and the retention contract, denoted as: S->A: $W_s:=g^K$, $X_s:=H(E_K(M))$, $Y_s:=RC$. The hash function H( ) can be any well known one-way, collision free, cryptographically secure hash function, e.g. SHA-2. The retention contract is an optional document that indicates the terms of the service agreement between the client and service provider. For example, it may include the names of the parties and terms and conditions for payments and penalties.

To assure that the client and the storage provider agree at the outset about the stored information, at step 308 the auditor verifies consistency of client information with storage provider information: $W_c=W_s$, $H(X_c)=X_s$, $Y_c=Y_s$. If any of the client-supplied information does not match the storage provider-supplied information, the initialization process may be aborted and the client and storage provider notified of the inconsistent information.

Assuming the information matches, at step 310 the auditor associates the retention contract information with the key commitment and the hash of the encrypted data set, denoted as: RC, $g^K$, $H(E_K(M))$. The key commitment is later used to verify that the storage provider has the correct key. The hash is later used in special circumstances to verify the integrity of the encrypted data.

At step 312, the auditor generates the challenge codes and expected response codes for the challenge-response pairs. The auditor generates n random numbers, $R_1, \ldots, R_n$ as the challenges, and computes n hashes, $HM_1, \ldots, HM_n$, as the responses. Each of these $HM_i$ are one-way, collision-free functions of both $R_i$ and $E_K(M)$, and require knowledge of the entirety of $R_i$ and $E_K(M)$. These hashes will be used in the verification phase to ensure the integrity of the encrypted data. In an example embodiment, the hashes are generated using keyed-hash message authentication codes (HMACs), i.e. $HM_i=HMAC(R_i;E_K(M))$. The HMAC's underlying hash function can be any cryptographically secure message digest, e.g. SHA-2. The response codes cannot be computed, for example, by the storage provider, unless both $R_i$ and $E_K(M)$ are known in their entirety. To avoid the storage overhead of the encrypted data, the auditor may discard the encrypted data and keep the challenge-response pairs: $L=\{(R_1; HM_1), \ldots, (R_n; HM_n)\}$. Those skilled in the art will recognize that the number of challenge-response pairs may be as many as is desirable to satisfy implementation restrictions and requirements.

Figure 4:
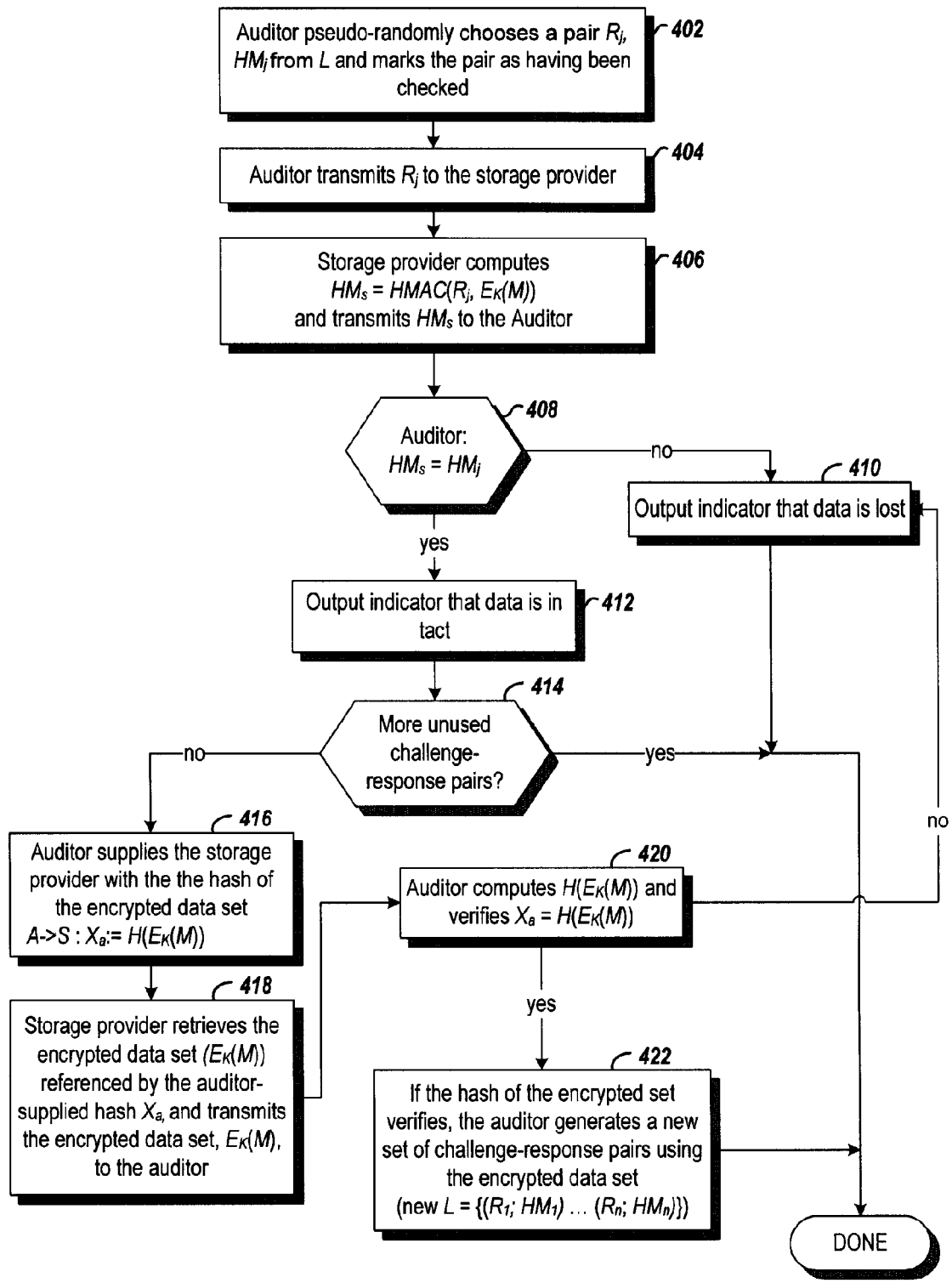
FIG. 4 is a flowchart of an example process containing further details for verifying the integrity of the storage provider's version of a client's data in accordance with an example embodiment of the invention.

FIG. 4 is a flowchart of an example process containing further details for verifying the integrity of the storage provider's version of a client's data in accordance with an example embodiment of the invention. In an example embodiment, the auditor repeatedly checks the storage provider's version of the client's encrypted data set. Each check establishes the data's integrity immediately before the check. To ensure that the original data is intact, the auditor checks that both the encrypted data is unchanged and the encryption key is unchanged. The checks may be performed automatically and periodically by the auditor or at prompting by the client.

At step 402 the auditor pseudo-randomly chooses a challenge-response pair $R_j$, $HM_j$ from L and marks the pair as having been used (or alternatively removes the pair from the set) At step 404 the auditor transmits the challenge code, $R_j$, to the storage provider. The storage provider, at step 406, computes a hash of the encrypted data set using the auditor-supplied $R_j$, denoted as: $HM_s=HMAC(R_j, E_K(M))$ with the same underlying digest, e.g. SHA-2. The storage provider supplies $HM_s$ to the auditor.

At step 408 the auditor checks whether the storage provider-supplied hash of the encrypted data set equals the auditor-generated hash of the encrypted data set ($HM_s=HM_j$). If the hash values do not match, the storage provider's version of the client's encrypted data set is corrupt, and at step 410 the auditor outputs an indicator (the "indicator" being data that indicates) that the storage provider has lost the client's data. If the hash values are equal, the auditor, at step 412, outputs an indicator that the client's encrypted data set is intact at the storage provider.

In order to avoid reusing the challenge-response pairs and reduce the risk of the storage provider falsely claiming to have valid data by saving the challenge-response pairs previously found to be valid, the auditor uses each challenge-response pair in the set only once. If decision step 414 finds that there are more unused challenge-response pairs the auditor is done until the next time that verification is required, for example, either at the prompting of the client or as part of a programmed periodic check.

To be practical, a verification protocol allows an auditor to check the encrypted data as often as necessary for an unbounded number of times. Once all the challenge-response pairs have been used the auditor, therefore, generates a new set of challenge-response pairs. The steps, beginning at step 416, allow the auditor to regenerate these pairs properly. The auditor at step 416 supplies the storage provider with the hash of the encrypted data set, denoted as: A->S: $X_a:=H(E_K(M))$.

The hash of the encrypted data identifies to the storage provider which data to return. At step 418, the storage provider responds by retrieving the encrypted data set associated with the auditor-supplied hash value and transmits the encrypted data set to the auditor. The storage provider is prevented from generating the encrypted data set from $X_a$ in an attempt to deceive the auditor since inverting H( ) is computationally infeasible. In an example embodiment, SHA-2 is used for the hash function.

The auditor at step 420 then generates the hash of the storage provider-supplied encrypted data set and determines whether the hash value the auditor supplied to the storage provider is equal to the hash of the storage provider-supplied encrypted data set ($X_a=(H(E_K(M))$. If the two hash values are equal, the auditor proceeds to generate the new set of challenge-response pairs as described in steps 312 and 314 of FIG. 3. The auditor may also delete the encrypted data set supplied by the storage provider. Otherwise, the auditor indicates that the storage provider's version of the client's encrypted data set is corrupt as described above (step 410).

Figure 5:
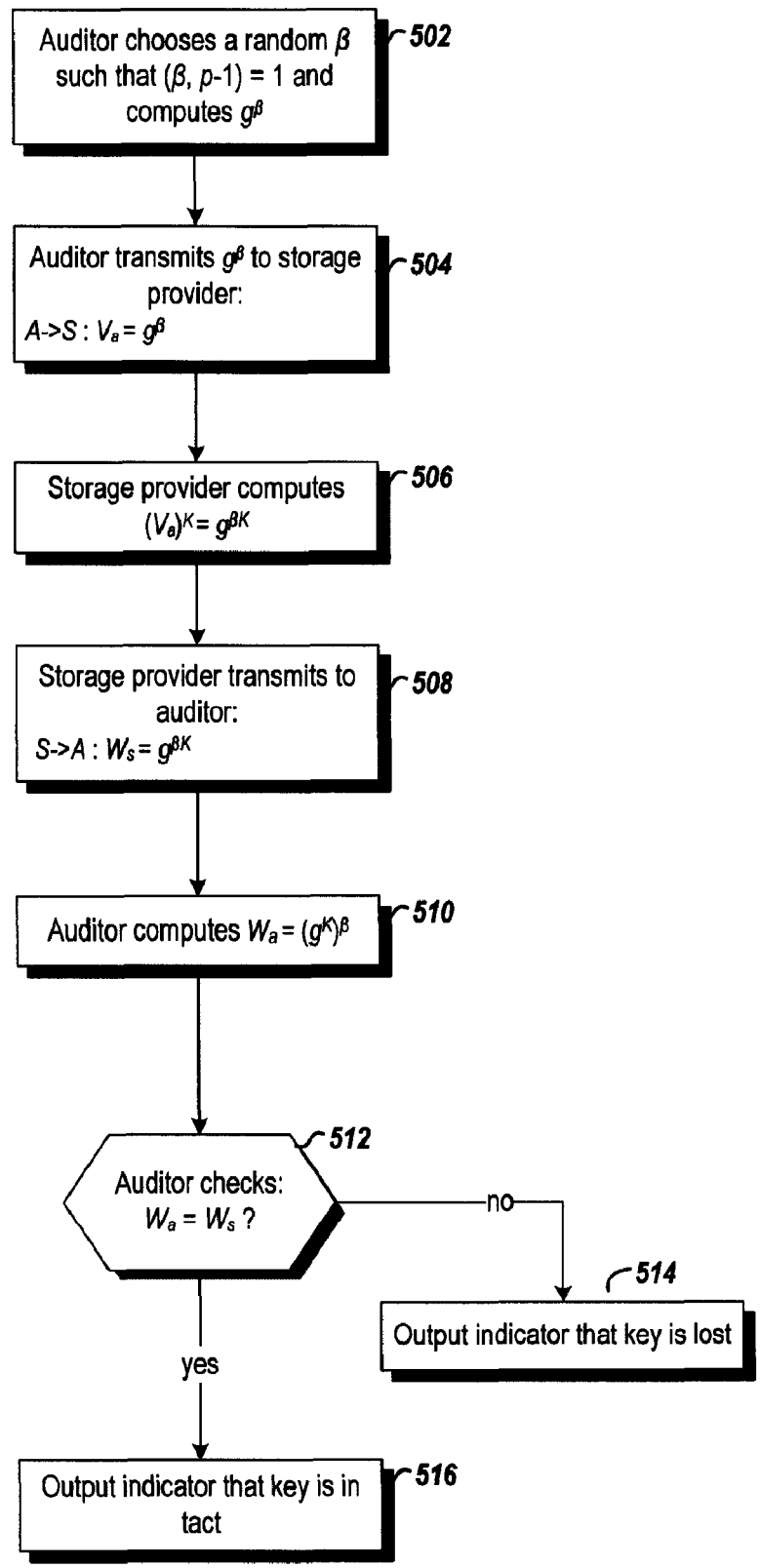
FIG. 5 is a flowchart of an example process for verifying the integrity of the encryption key that is stored by the storage provider in accordance with one embodiment.
Figure 6:
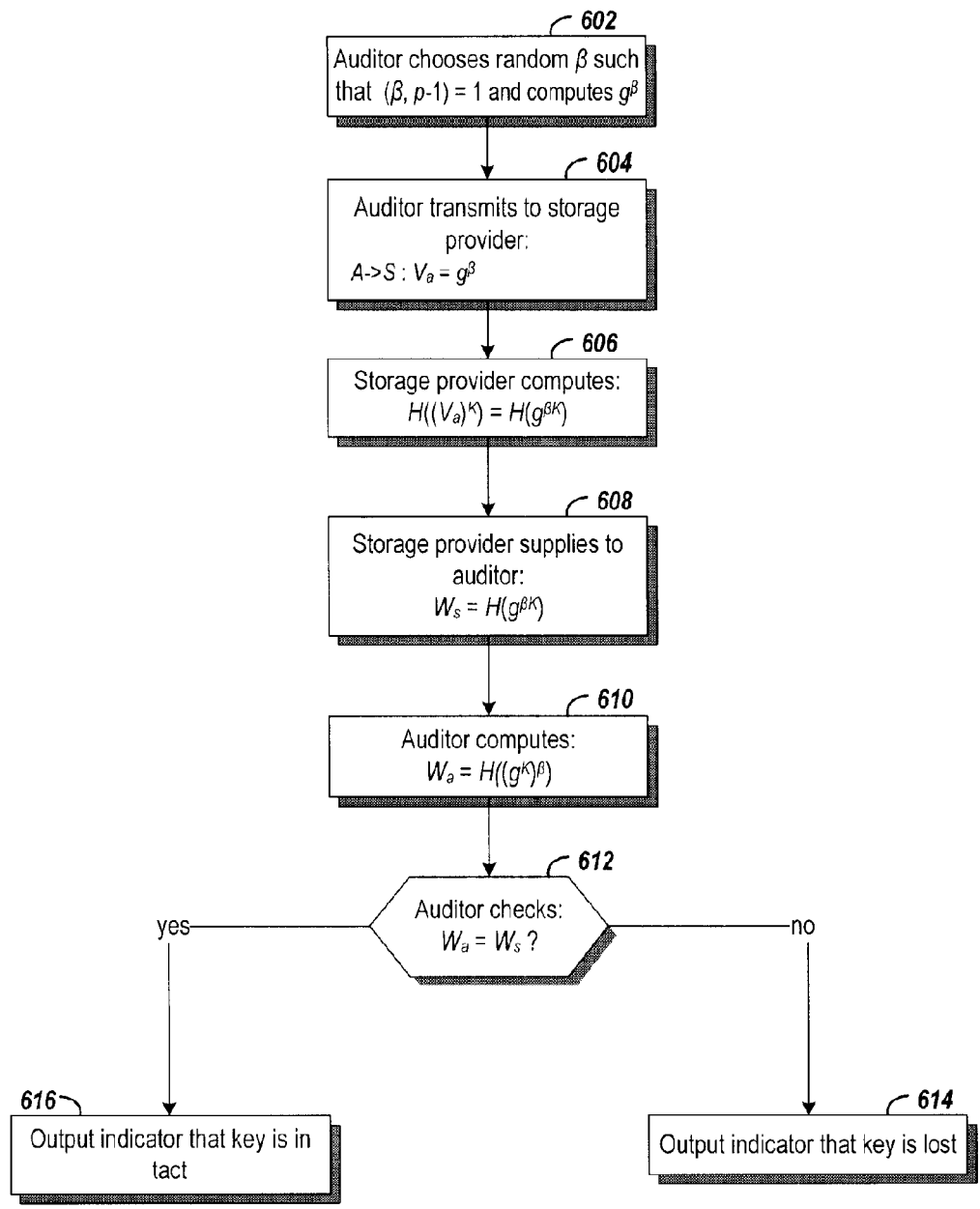
FIG. 6 is a flowchart of an example process for verifying the integrity of an encryption key that is stored by the storage provider in accordance with another embodiment.
Figure 7:
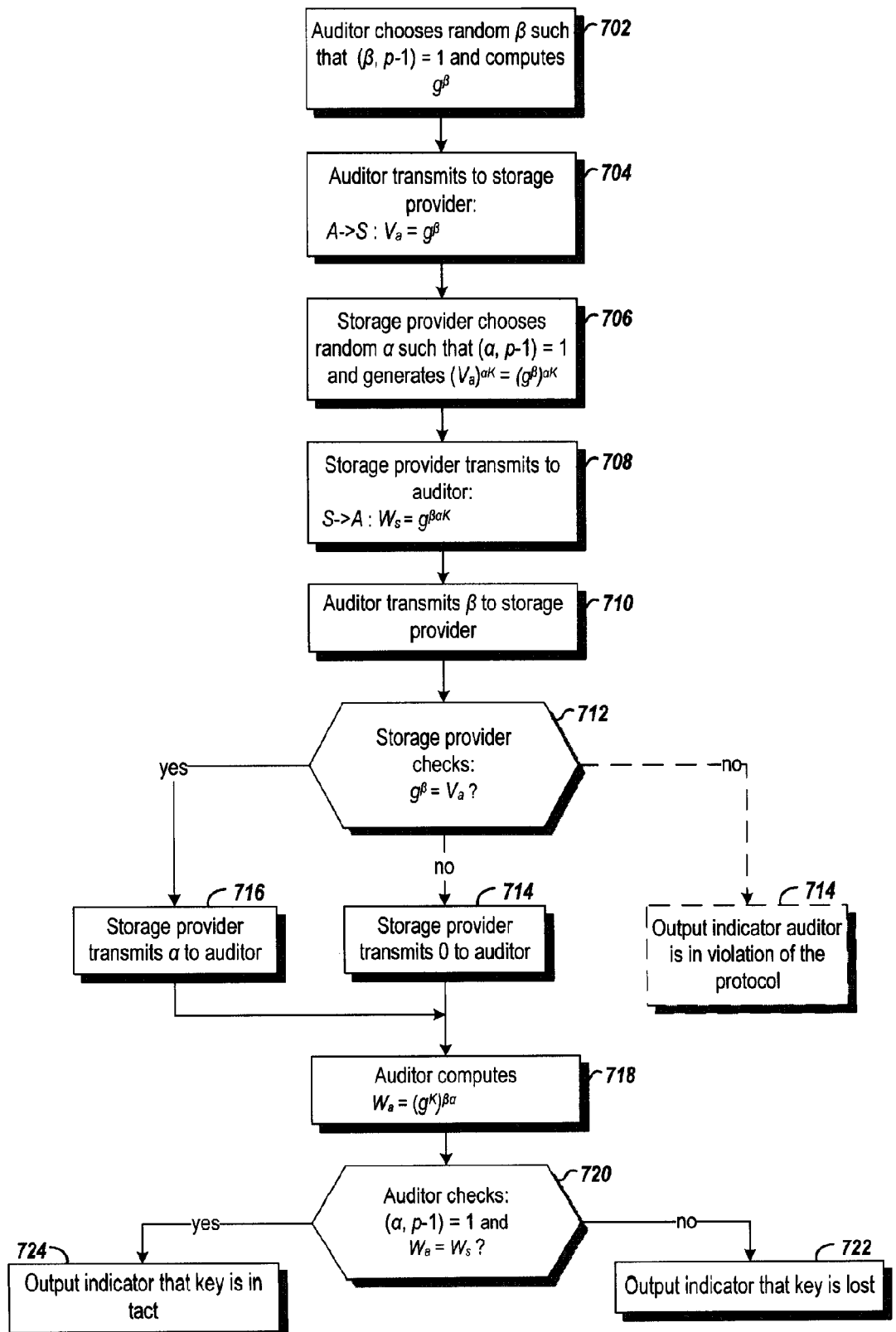
FIG. 7 is a flowchart of an example process for verifying the integrity of the encryption key that is stored by the storage provider in accordance with another embodiment.

Three alternative protocols are illustrated and described in FIGS. 5, 6, and 7 for verifying that the storage provider's version of the encryption key, K, is intact. These protocols allow an auditor to verify the encryption key repeatedly for an unbounded number of times. The key verification protocols guard against two threats. First, the protocols ensure that the storage provider cannot cheat by pre-computing and/or caching the correct response to the auditor's challenge without having the correct key, K. Second, the protocol ensures that the auditor cannot learn anything about the value of K.

The protocols differ in how they handle the threats from a cheating auditor. The first and second protocols require one round-trip of communication between the auditor and the storage provider, namely a challenge from the auditor to the storage provider and a response from the storage provider to the auditor. The first protocol maintains the privacy of the encryption key only if a curious auditor strictly follows the challenge-computation in the protocol. The second protocol maintains privacy even when a dishonest auditor disobeys the challenge computation step. This second protocol, however, relies on the outputs of the hash function H( ) to appear random. The third protocol requires two round-trips of communications. This third protocol maintains privacy even with a dishonest auditor and without relying on H( ).

FIG. 5 is a flowchart of an example process for verifying the integrity of the encryption key that is stored by the storage provider in accordance with one embodiment.

At step 502 the auditor chooses a random • such that the greatest common divisor of (•, p−1)=1 and computes $g^•$. At step 504 the auditor transmits $V_a=g^•$ to storage provider, denoted as: A->S:$V_a=g^•$.

The storage provider, at step 506, computes $(V_a)^K=g^{•K}$. At step 508 the storage provider transmits $g^{•K}$ to the auditor, denoted as: S->A:$W_s=g^{•K}$.

Using its locally stored key commitment value $g^K$ (received from the client), and the • generated at step 502, the auditor computes $W_a=(g^K)^•$ at step 510. At decision step 512 the auditor checks whether the auditor-computed $W_a$ is equal to the storage provider computed $W_s$. If the values are not equal, the storage provider's version of the encryption key is incorrect and at step 514 the auditor outputs an indicator that the key is lost. If the values are equal, the auditor at step 516 outputs an indicator that the encryption key is intact at the storage provider. Alternatively, or in combination, the auditor may provide the indicator as a status code to the client and/or storage provider.

FIG. 6 is a flowchart of an example process for verifying the integrity of an encryption key that is stored by the storage provider in accordance with another embodiment. A dishonest auditor that does not follow the protocol of FIG. 5 could carefully choose a sequence of challenges $\{V_i\}$ (step 502) such that K may be computed from the responses $\{(V_i)^K\}$ (steps 506 and 508). To alleviate this concern, the protocol of FIG. 6, relies on a one-way, collision-resistant, hash, H( ), (e.g. SHA-2) whose outputs appear random to conceal K from the dishonest auditor.

At step 602, the auditor chooses a random • such that the greatest common divisor of (•, p−1)=1, and the auditor computes $g^•$. The auditor transmits the computed $g^•$ to the storage provider at step 604, denoted as: A->S:$V_a=g^•$.

Using the value $V_a$ passed to the storage provider, at step 606, the storage provider computes: $H((V_a)^K)$, which is equivalent to the expected response $H(g^{•K})$, and at step 608 the storage provider supplies the computed $H(g^{•K})$ to the auditor, denoted as: S->A:$W_s=H(g^{•K})$.

In response to the storage provider-supplied $H(g^{•K})$, the auditor computes: $W_a=H((g^K)^•)$ at step 610 using its locally stored key-commitment value $g^K$ and the • generated at step 602.

At decision step 612 the auditor checks whether $W_a=W_s$. If the values are not equal, the storage provider's version of the encryption key is incorrect and at step 614 the auditor outputs an indicator that the key is lost. If the values are equal, the auditor at step 616 outputs an indicator that the client's key is intact at the storage provider.

FIG. 7 is a flowchart of an example process for verifying the integrity of the encryption key that is stored by the storage provider in accordance with another embodiment. The embodiment of FIG. 7, like that of FIG. 6, prevents against a dishonest auditor but does not rely on a hash function, H( ), whose outputs appear random.

At step 702 the auditor chooses a random • such that the greatest common divisor of (•, p−1)=1; the auditor then computes $g^•$. The auditor transmits $g^•$ to the storage provider at step 704, denoted: A->S:$V_a=g^•$.

In response to the auditor's challenge, the storage provider, at step 706, chooses a random • such that the greatest common divisor of (•, p−1)=1. The storage provider then computes $(V_a)^{•K}$, which is equivalent to $(g^•)^{•K}$. The storage provider transmits the computed $g^{••K}$ to the auditor at step 708, denoted as: S->A:$W_s=g^{••K}$.

In response to the storage provider's first response, the auditor transmits • to the storage provider at step 710. At step 712 the storage provider checks whether the $V_a$ received from the auditor at step 704 is equal to $g^•$ as computed by the storage provider from • transmitted by the auditor at step 710. If the values are not equal, the storage provider, at step 714, transmits the value •=0 to the auditor. By transmitting 0 to the auditor, when the auditor proceeds to verify the storage provider's response (steps 720, 722), the auditor will determine that the storage provider has returned an invalid response and assert that the storage provider has lost the key. However, the storage provider will have evidence that the auditor is not following the protocol since $g^•$ as computed by the storage provider from • transmitted by the auditor at step 710 is not equal to the $V_a$ received from the auditor at step 704. In an alternative embodiment, the storage provider may output an indicator at step 716 signaling that the storage provider believes the auditor is incorrectly implementing protocol.

If $V_a$ is equal to $g^•$ the storage provider transmits • to the auditor at step 718. In response, the auditor, at step 720 computes $W_a=(g^K)^{••}$. At step 722, the auditor checks whether both (•, p−1)=1 and $W_a=W_s$. If either one of the checks fails, the auditor outputs an indicator that the storage provider's version of the encryption key is corrupt at step 724. Otherwise, the auditor outputs an indicator that the key is intact at step 726.

In another embodiment, the various challenge and response communications between the auditor and storage provider may be logged in order to keep a record of the parties honoring their respective obligations under the retention contract. The auditor and storage provider may attach signatures and timestamps to the challenges and responses for the encrypted data and encryption key verification. Such signatures may be generated using public-private key encryption techniques, for example. The auditor and storage provider may log these signed communications to retentive storage. Should questions arise as to the veracity of either the auditor or storage provider days, weeks, months, or even years after an audit takes place, the signed challenges and responses may be used to establish which party has and which party has not complied with its obligations.

Those skilled in the art will appreciate that various alternative computing arrangements would be suitable for hosting the processes of the different embodiments of the present invention. For example, the processes may be implemented on single processor, multi-processor, parallel processor, or an arrangement of processors on a local area network. In addition, the processes may be provided via a variety of computer-readable storage media or delivery channels such as magnetic or optical disks or tapes, electronic storage devices, or as application services over a network.

The present invention is believed to be applicable to a variety of auditing applications and has been found to be particularly applicable and beneficial in third-party auditing of client data maintained by a storage provider. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer implemented method for auditing integrity of stored data, comprising:
   determining by an auditor coupled to a processor, whether a data set stored at a first storage arrangement by a storage provider on behalf of a client is corrupt without reliance on any part of the data set and any derivative of any part of the data set stored by the client, wherein the data set includes an encryption key and an encrypted version of the data set encrypted with the encryption key, wherein the determining by the auditor includes determining whether the encryption key is corrupt without exposing a value of the encryption key to the auditor, wherein the determining whether the encryption key is corrupt comprises:
      issuing a key challenge from the auditor to the storage provider having the encryption key, wherein the key challenge is a function of a pseudo-random value generated by the auditor;
      selecting by the storage provider having the encryption key, in response to the key challenge, a pseudo-random $\alpha$ for which the greatest common divisor of $\alpha$ and p−1 is equal to 1, wherein p is a prime number and $\alpha$ is an integer;
      generating by the storage provider having the encryption key, an actual key response as a function of the key challenge, the value of the encryption key, and $\alpha$; and
      providing the actual key response to the auditor, wherein the actual response does not reveal the value of the encryption key to the auditor to prevent exposure of information specified by the data set to the auditor while the auditor is determining whether the data set stored at the first storage arrangement is corrupt; and
   outputting, by the processor, data indicative of data corruption in response to determining that the data set stored at the first storage arrangement is corrupt.

2. The method of claim 1, further comprising:
   wherein the data set is stored in one or more storage arrangements by one or more storage providers;
   wherein the determining by the auditor includes,
      determining whether the encrypted version of the data set is corrupt without exposing unencrypted values of the data set to the auditor; and
   wherein the outputting includes outputting data indicative of encrypted data corruption in response to determining that the encrypted data is corrupt and outputting data indicative of key corruption in response to determining that the encryption key is corrupt.

3. The method of claim 2, further comprising:
   inputting a key commitment value to the auditor, wherein the key commitment value is a function of the encryption key and binds the storage provider to a value of the encryption key without revealing the encryption key to the auditor;
   wherein the determining whether the encryption key is corrupt includes:
      determining by the auditor whether the actual key response matches an expected key response, wherein the expected key response is a function of the key commitment value and the pseudo-random value; and
      outputting data indicative of the encryption key being corrupt in response to the actual key response being not equal to the expected key response.

4. The method of claim 3, further comprising:
   wherein the key commitment value is a function of a generator for a cyclic group and the encryption key;
   wherein the key challenge is a function of the generator and the pseudo-random value, $\beta$, for which the greatest common divisor of $\beta$ and p−1 is equal to 1, wherein p is a prime number that is greater than the encryption key and $\beta$ is an integer;
   wherein the expected key response is a function of the key commitment value and the pseudo-random value $\beta$.

5. The method of claim 3, further comprising:
   wherein the key commitment value is a function of a generator for a cyclic group and the encryption key;
   wherein the key challenge is a function of the generator and the pseudo-random value, $\beta$, for which the greatest common divisor of $\beta$ and p−1 is equal to 1, wherein p is a prime number that is greater than the encryption key and $\beta$ is an integer;
   wherein the actual key response is a hash function of the encryption key and the key challenge;
   wherein the expected key response is a hash function of the key commitment value and the pseudo-random value, $\beta$.

6. The method of claim 3, further comprising:
   wherein the key commitment value is a function of a generator for a cyclic group and the encryption key;
   wherein the key challenge is a function of the generator and the pseudo-random value, $\beta$, for which the greatest common divisor of $\beta$ and p−1 is equal to 1, wherein p is a prime number that is greater than the encryption key and $\beta$ is an integer;
   providing $\beta$ from the auditor to the storage provider having the encryption key;
   generating by the storage provider having the encryption key, a test code as a function of $\beta$ and the generator;
   outputting data indicative of the auditor violating a protocol in response to the test code being not equal to the key-challenge code;
   providing $\alpha$ from the storage provider having the encryption key to the auditor in response to the test code being equal to the key-challenge code;
   generating by the auditor, an expected key response as a function of the key commitment value, $\alpha$, and $\beta$;
   outputting data indicative of the encryption key being corrupt in response to the actual key response code being not equal to the expected key-response code; and
   outputting data indicative of the encryption key being corrupt in response to a greatest common divisor of $\alpha$, and p−1, being not equal to 1.

7. The method of claim 1, further comprising:
   wherein the preventing includes providing to the auditor, a copy of the encrypted version of the data set based on the encryption key;
   wherein the determining by the auditor includes:
      generating and storing a plurality of challenge-response pairs based on the copy of the encrypted version of the data set, wherein each challenge-response pair includes a challenge code and an expected response code; and
      providing one challenge code of the plurality of challenge-response pairs from the auditor to the storage provider having the encrypted version of the data set; and the determining by the auditor further includes comparing the actual response code with the expected response code paired with the one challenge code.

8. The method of claim 7, further comprising:
repeating for a plurality of challenge codes in the plurality of challenge-response pairs, the steps of providing one challenge code, generating an actual response code by the storage provider having the encrypted version of the data set, and comparing the actual response code with the expected response code; and for each challenge code provided to the storage provider having the encrypted version of the data set, storing by the auditor, in association with an actual response code generated by the storage provider, the expected response code paired with the challenge code.

9. The method of claim 7, wherein the challenge code in each challenge-response pair is a pseudo-random number and the response code in the pair is a one-way, collision-free hash function of the challenge code and the encrypted version of the original data set.

10. A computer implemented method for verifying integrity of stored data, comprising:
storing an encrypted data set of a client and an associated encryption key at one or more storage providers;
generating and storing by an auditor coupled to a processor, a plurality of challenge-response pairs based on the encrypted data set provided to the auditor, each challenge-response pair including a challenge code and an expected response code;
inputting a key commitment value to the auditor, wherein the key commitment value is a function of the encryption key and binds the storage provider to a value of the encryption key without revealing the encryption key to the auditor;
verifying integrity of the encrypted data set at a first storage provider of the one or more storage providers having the encrypted data set, by:
providing a selected challenge code of a selected one of the plurality of challenge-response pairs from the auditor to the first storage provider;
generating by the first storage provider, an actual response code by the storage provider based on the selected challenge code and the encrypted data set and transmitting the actual response code to the auditor; and
outputting by the auditor an integrity code having a value based on a comparison of the actual response code with the expected response code paired with the selected challenge code;
verifying integrity of the encryption key at a second storage provider of the one or more storage providers having the encryption key, by:
issuing a key challenge from the auditor to the second storage provider, wherein the key challenge is a function of a pseudo-random value generated by the auditor;
selecting by the storage provider with the encryption key, in response to the key challenge, a pseudo-random $\alpha$ for which the greatest common divisor of $\alpha$ and $p-1$ is equal to 1;
generating by the second storage provider an actual key response as a function of the key challenge, $\alpha$, and the encryption key and providing the actual key response to the auditor, wherein the actual response does not reveal the encryption key to the auditor; and
wherein p is a prime number and $\alpha$ is an integer; and determining by the auditor whether the actual key response matches an expected key response, wherein the expected key response is a function of the key commitment value and the pseudo-random value; and
outputting, by the processor, data indicative of the encryption key being corrupt in response to the actual key response being not equal to the expected key response.

11. An apparatus for auditing integrity of stored data, comprising:
a processor;
an auditor coupled to the processor, to determine whether a data set stored at a first storage arrangement by a storage provider on behalf of a client is corrupt without reliance on any part of the data set and any derivative of any part of the data set stored by the client to prevent exposure of information specified by the data set to the auditor while the auditor generates and stores a plurality of challenge-response pairs based on a copy of an encrypted version of the data set and determines whether the data set stored at the first storage arrangement is corrupt, wherein to determine by the auditor includes to determine by the auditor whether a encryption key stored by a storage provider is corrupt, wherein to determine whether the encryption key is corrupt comprises:
issue a key challenge as one of the challenge codes from the plurality of challenge-response pairs from the auditor to the storage, wherein the key challenge is a function of a pseudo-random value generated by the auditor;
select by the storage provider, in response to the key challenge, a pseudo-random $\alpha$ for which the greatest common divisor of $\alpha$ and $p-1$ is equal to 1; wherein p is a prime number and $\alpha$ is an integer; and
generate by the storage provider, an actual key response as a function of the key challenge, a value of the encryption key, and $\alpha$, wherein the actual response does not reveal the value of the encryption key to the auditor; and
a memory coupled to the processor to store data indicative of data corruption, wherein the processor outputs the data indicative of data corruption when the data set stored at the first storage arrangement is determined to be corrupt.

12. An article of manufacture, comprising:
a non-transitory processor-readable program storage medium with instructions to:
determine by an auditor coupled to a processor, whether a data set stored at a first storage arrangement by a storage provider on behalf of a client is corrupt without reliance on any part of the data set and any derivative of any part of the data set stored by the client, wherein the data set includes an encryption key and an encrypted version of the data set encrypted with the encryption key stored in one or more storage arrangements by one or more storage providers, wherein to determine by the auditor includes to determine by the auditor whether the encryption key is corrupt, wherein to determine whether the encryption key is corrupt comprises instructions to:
generate and store a plurality of challenge-response pairs based on a copy of the encrypted version of the data set, wherein each challenge-response pair includes a challenge code and an expected response code;
provide one challenge code of the plurality of challenge-response pairs from the auditor to the storage provider with the encrypted version of the data set;

issue a key challenge from the auditor to the storage provider that has the encryption key, wherein the key challenge is a function of a pseudo-random value generated by the auditor;

select by the storage provider with the encryption key, in response to the key challenge, a pseudo-random α for which the greatest common divisor of α and p−1 is equal to 1; wherein p is a prime number and α is an integer; and generate by the storage provider with the encryption key, an actual key response as a function of the key challenge, a value of the encryption key, and α, wherein the actual response does not reveal the value of the encryption key to the auditor; and output, by the processor, data indicative of data corruption when the data set stored at the first storage arrangement is determined to be corrupt.

13. The article of manufacture of claim 12, further comprising:

wherein to determine by the auditor includes,
determine whether the encrypted version of the data set is corrupt without exposing unencrypted values of the data set to the auditor; and wherein to output includes data indicative of encrypted data corruption in response to a determination that the encrypted data is corrupt and output data indicative of key corruption in response to determine that the encryption key is corrupt.

14. The article of manufacture of claim 13, further comprising instructions to:

prevent exposure of information specified by the data set to the auditor while the auditor is determining whether the data set stored at the first storage arrangement is corrupt, wherein to prevent exposure of information specified by the data set includes providing to the auditor, the copy of the encrypted version of the data set based on the encryption key;

the instructions further include to provide the actual response code to the auditor; and to determine further includes to compare the actual response code with the expected response code paired with the one challenge code.

15. The article of manufacture of claim 14, wherein the instructions further include to:

repeat for a plurality of challenge codes in the plurality of challenge-response pairs, the steps of providing one challenge code, generating an actual response code by the storage provider having the encrypted version of the data set, and comparing the actual response code with the expected response code; and for each challenge code provided to the storage provider having the encrypted version of the data set, store by the auditor, in association with an actual response code generated by the storage provider, the expected response code paired with the challenge code.

16. The article of manufacture of claim 14, wherein the challenge code in each challenge-response pair is a pseudo-random number and the response code in the pair is a one-way, collision-free hash function of the challenge code and the encrypted version of the original data set.

17. The article of manufacture of claim 13, wherein the instructions further include to:

input a key commitment value to the auditor, wherein the key commitment value is a function of the encryption key and binds the storage provider to a value of the encryption key without revealing the encryption key to the auditor;

wherein to determine whether the encryption key is corrupt includes:
determine by the auditor whether the actual key response matches an expected key response, wherein the expected key response is a function of the key commitment value and the pseudo-random value; and
output data indicative of the encryption key being corrupt in response to the actual key response being not equal to the expected key response.

18. The article of manufacture of claim 17, further comprising:

wherein the key commitment value is a function of a generator for a cyclic group and the encryption key;

wherein the key challenge is a function of the generator and the pseudo-random value, β, for which the greatest common divisor of β and p−1 is equal to 1, wherein p is a prime number that is greater than the encryption key and β is an integer;

wherein the expected key response is a function of the key commitment value and the pseudo-random β.

19. The article of manufacture of claim 17, further comprising:

wherein the key commitment value is a function of a generator for a cyclic group and the encryption key;

wherein the key challenge is a function of the generator and the pseudo-random value, β, for which the greatest common divisor of β and p−1 is equal to 1, wherein p is a prime number that is greater than the encryption key and β is an integer;

wherein the actual key response is a hash function of the encryption key and the key challenge;

wherein the expected key response is a hash function of the key commitment value and the pseudo-random value, β.

20. The article of manufacture of claim 17, further comprising:

wherein the key commitment value is a function of a generator for a cyclic group and the encryption key;

wherein the key challenge is a function of the generator and the pseudo-random value, β, for which the greatest common divisor of β and p−1 is equal to 1, wherein p is a prime number that is greater than the encryption key and β is an integer;

wherein the instructions further include to:
provide β from the auditor to the storage provider having the encryption key;
generate by the storage provider having the encryption key, a test code as a function of β and the generator;
output data indicative of the auditor violating a protocol in response to the test code being not equal to the key-challenge code;
provide α from the storage provider having the encryption key to the auditor in response to the test code being equal to the key-challenge code;
generate by the auditor, an expected key response as a function of the key commitment value, α, and β;
output data indicative of the encryption key being corrupt in response to the actual key response code being not equal to the expected key-response code; and
output data indicative of the encryption key being corrupt in response to a greatest common divisor of α, and p−1, being not equal to 1.

* * * * *

UNITED STATES PATENT AND TRADEMARK OFFICE
CERTIFICATE OF CORRECTION

PATENT NO. : 8,392,708 B2  
APPLICATION NO. : 12/240742  
DATED : March 5, 2013  
INVENTOR(S) : Mehul A. Shah et al.

Page 1 of 1

It is certified that error appears in the above-identified patent and that said Letters Patent is hereby corrected as shown below:

In the Claims:

In column 11, line 34, in Claim 1, delete "α ;" and insert -- α; --, therefor.

In column 13, line 61, in Claim 10, delete "p-1is" and insert -- p-1 is --, therefor.

Signed and Sealed this
Seventeenth Day of September, 2013

Teresa Stanek Rea
*Deputy Director of the United States Patent and Trademark Office*